United States Patent Office 3,299,129
Patented Jan. 17, 1967

3,299,129
CYANOIMIDODITHIOCARBONATES
John J. D'Amico, Charleston, W. Va., assignor to Monsanto Company, St. Louis, Mo., a corporation of Delaware
No Drawing. Filed Dec. 13, 1963, Ser. No. 330,224
6 Claims. (Cl. 260—551)

This invention relates to new compositions of matter useful as biological toxicants and to methods for their preparation. The new compounds are cyanoimidodithiocarbonates of the following general formula:

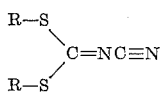

where R is lower alkenyl, halogen substituted lower alkenyl, or lower alkynyl. Examples of R comprise allyl, 2-methallyl, 2-chloroallyl, 2-bromoallyl, 2-iodoallyl, 2-fluoroallyl, 3-chloroallyl, 3-iodoallyl, 3-bromoallyl, 3-fluoroallyl, 2-fluoro-3-chloroallyl, 3-bromo-2-butenyl, 3-chloro-2-butenyl, 2,3-dichloroallyl, 2,3-dibromoallyl,3,3-dichloroallyl, 2,3-dichloro-2-butenyl, 2,3-diiodo-2-butenyl, 2,3-dichloro-4-bromobutenyl, 2,3,3-trichloroallyl, 2-propynyl, and 2-butynyl.

The new compounds can be prepared readily by condensing salts of the corresponding cyanoimidodithiocarbonic acid with the halide containing the desired R radical. These salts can be prepared from carbon disulfide, cyanamide, and an alkali-metal hydroxide as published in Annalen, vol. 331, pages 265–297 (1904). Aqueous solutions of water soluble salts can be prepared from calcium or other alkaline earth metal cyanamides as described in U.S. Patent 2,816,136 issued December 10, 1957, to John D. Pera.

The following examples illustrate the preparation but are not to be taken as limitative.

Example 1

To a stirred solution containing 38.8 grams (0.2 mole) of potassium cyanoimidodithiocarbonate and 400 ml. of water (pH=9.6) was added in one portion, 76 grams (0.4 mole) of 2,3,3-trichloroallyl chloride and the mixture stirred at 25–30° C. for 3 days at which time the pH was 6.5. The reaction mixture was extracted with 500 ml. of ethyl ether. The ether solution was washed with water until the washings were neutral to litmus and dried over sodium sulfate. Ether was removed in vacuo at a maximum temperature of 30° C./1–2 mm. S,S'-bis(2,3,3-trichloroallyl)cyanoimidothiccarbonate was obtained in 82% yield as a solid, M.P. 48–50° C., soluble in ether, acetone, benzene, ethanol, and hot heptane but insoluble in water. Upon recrystallization from heptane, it melted at 51–52° C. It contained 7.00% nitrogen, 15.94% sulfur, and 52.20% chlorine compared to 6.92% nitrogen, 15.83% sulfur, and 52.53% chlorine calculated for $C_8H_4Cl_6N_2S_2$.

Example 2

To a stirred solution (pH=9.6) comprising 70 grams (0.36 mole) of potassium cyanoimidodithiocarbonate in 750 ml. of water was added, in one portion, 55 grams (0.72 mole) of allyl chloride. The reaction mixture was stirred at 25–30° C. for 24 hours and then extracted with 500 ml. of ethyl ether (pH of aqueous layer=7.3). The ether solution was washed with water until the washings were neutral to litmus and dried over sodium sulfate. The ether was removed in vacuo at a maximum temperature of 30° C./1–2 mm. S,S'-bis(allyl)cyanoimidodithiocarbonate was obtained in 75.5% yield as an amber liquid soluble in ether, acetone, benzene, and ethanol but insoluble in heptane and water. Analysis gave 13.72% nitrogen and 31.76% sulfur compared to 14.13% nitrogen and 32.34% sulfur calculated for $C_8H_{10}N_2S_2$.

Example 3

To a stirred slurry containing 38.8 grams (0.2 mole) of potassium cyanoimidodithiocarbonate in 150 ml. of ethyl alcohol and 50 ml. of water was added, in one portion, 44.4 grams (0.4 mole) of 2,3-dichloro-1-propene. The reaction mixture was heated at 50–60° C. for 6 hours and then maintained at 25–30° C. for 18 hours. To the reaction mixture 300 ml. of water and 500 ml. of ethyl ether were added. After stirring for 15 minutes, the separated ether layer was washed with water until the washings were neutral to litmus and dried over sodium sulfate. The ether was removed in vacuo at a maximum temperature of 80–90° C./1–2 mm. S,S'-bis(2-chloroallyl)cyanoimidodithiocarbonate was obtained in 43.2% yield as an amber oil soluble in ether, acetone, benzene, and ethanol but insoluble in water and heptane. Analysis gave 10.50% nitrogen and 24.32% sulfur as compared to 10.48% nitrogen and 24.00% sulfur calculated for $C_8H_8Cl_2N_2S_2$.

Example 4

To a stirred solution comprising 38.8 grams (0.2 mole) of potassium cyanoimidodithiocarbonate in 150 ml. of water was added, in one portion, 36.2 grams (0.4 mole) of 2-methallyl chloride and the mixture stirred at 25–30° C. for 2 days. The reaction mixture was then extracted with 400 ml. of ethyl ether, the ether solution washed with water until the washings were neutral to litmus and dried over sodium sulfate. The ether was removed in vacuo at a maximum temperature of 80–90° C./1–2 mm. S,S'-bis(2-methallyl)cyanoimidodithiocarbonate was obtained in 75% yield as an amber liquid insoluble in water but soluble in common organic solvents. Analysis gave 12.42% nitrogen and 28.16% sulfur compared to 12.38% nitrogen and 28.33% sulfur calculated for $C_{10}H_{14}N_2S_2$.

Example 5

To a stirred solution comprising 38.8 grams (0.2 mole) of potassium cyanoimidodithiocarbonate in 200 ml. of water was added, in one portion, 58.2 grams (0.4 mole) of freshly distilled 1,1,3-trichloro-1-propene and the mixture stirred at 25 to 30° C. for 3 days. The reaction mixture was then extracted with 400 ml. of ethyl ether and the ether solution washed with water until the washings were neutral to litmus and dried over sodium sulfate. The ether was removed in vacuo at a maximum temperature of 80 to 90° C./1–2 mm. The product S,S'-bis(3,3-dichloroallyl)cyanoimidodithiocarbonate was obtained in a yield of 68.5%. Analysis gave 8.22% nitrogen and 19.76% sulfur as compared to 8.34% nitrogen and 19.08% sulfur calculated for $C_8H_6Cl_4N_2S_2$.

Example 6

To a stirred solution containing 38.8 grams (0.2 mole) of potassium cyanoimidodithiocarbonate in 400 ml. of water (pH=9.6) was added, in one portion, 62.4 grams (0.4 mole) of 2-bromoallyl chloride. The reaction mixture was stirred at 25–30° C. for 2 days at which time the pH was 7. The product was isolated as described in Example 5. S,S'-bis(2-bromoallyl)cyanoimidodithiocarbonate was obtained in 57.7% yield as an amber oil. It was soluble in ether, acetone, benzene, and ethanol but insoluble in water and heptane. Analysis gave 7.80% nitrogen and 17.96% sulfur compared to 7.87% nitrogen and 18.00% sulfur calculated for $C_8H_8Br_2N_2S_2$.

Example 7

To a stirred solution (pH=9.6) comprising 78.8 grams (0.4 mole) of potassium cyanoimidodithiocarbonate in 800 ml. of water was added, in one portion, at 0° C. 95.2 grams (0.8 mole) of 3-bromo-1-propyne. The stirred reaction mixture was held at 0–15° C. for one hour by ice cooling and then at 25–30° C. for 24 hours (pH=7.4). After cooling to 0° C. the precipitate was collected by filtration, washed with water until the washings were neutral to litmus and air-dried at 25–30° C. S,S'-bis(2-propynyl) cyanoimidodithiocarbonate was obtained in 90.5% yield as a tan solid melting at 94–95° C. after recrystallization from ethyl acetate. It was slightly soluble in ether and benzene, slightly soluble in ethanol, soluble in hot acetone, but insoluble in heptane and water. Analysis gave 14.49% nitrogen and 33.05% sulfur as compared to 14.42% nitrogen and 33.01% sulfur calculated for $C_8H_6N_2S_2$.

Example 8

To a stirred solution (pH=9.6) comprising 77.6 grams (0.4 mole) of potassium cyanoimidodithiocarbonate in 800 ml. of water was added, in one portion, 88.8 grams (0.8 mole) of 3-chloroallyl chloride. The reaction mixture was then stirred at 25–30° C. for 2 days (ph=6.5), extracted with 500 ml. of ethyl ether and isolated as described in Example 5. S,S'-bis(3-chloroallyl) cyanoimidodithiocarbonate was obtained in 74.5% yield as an amber liquid soluble in ether, acetone, benzene, and ethanol but insoluble in heptane and water. Analysis gave 24.09% sulfur as compared to a calculated value of 24.00% for $C_8H_8Cl_2N_2S_2$.

Example 9

The general procedure of Example 8 was followed substituting 116.4 grams (0.8 mole) of cis- and trans-2,3-dichloroallyl chloride for the 3-chloroallyl chloride. The pH of the reaction mixture after stirring at 25–30° C. for 2 days was 6.3. cis- and trans-S,S'-bis(2,3-dichloroallyl)cyanoimidodithiocarbonate was obtained in 62.2% yield as a black oil slightly soluble in ether, soluble in acetone, benzene, and ethanol but insoluble in heptane and water. Analysis gave 8.81% nitrogen and 19.71% sulfur compared to 8.34% nitrogen and 19.08% sulfur calculated for $C_8H_6Cl_4N_2S_2$.

Example 10

The procedure of Example 8 was followed substituting an equimolecular proportion of 3-chloro-2-butenyl chloride for the 3-chloroallyl chloride. The pH of the reaction mixture after stirring at 25–30° C. for 20 days was 5.2. S,S' - bis(3 - chloro-2-butenyl(cyanoimidodiththiocarbonate was obtained in 81.5% yield as an amber liquid soluble in ethanol, ether, acetone, benzene and hot heptane but insoluble in water. Analysis gave 9.42% nitrogen, 21.59% sulfur, and 24.50% chlorine as compared to 9.49% nitrogen, 21.72% sulfur, and 24.02% chlorine calculated for $C_{10}H_{12}Cl_2N_2S_2$.

The biological activity of the compounds of this invention was illustrated in a variety of experiments as will be described more fully hereinafter. The biological compositions were prepared according to common methods for convenience of application to the control of various organisms. The concentration of the compounds in the carrier or vehicle varied depending upon the organisms being treated and the particular compound of the generic formula which was employed. In general the concentration was very small, e.g., from 1 part per 100,000,000 to 1 part by weight in 10,000 by weight of inert carrier. Higher concentrations were desirable in some instances. Some of the compounds were especially useful as the active ingredients in toxic quantities in soil fungicidal compositions. S,S'-bis(2-chloroallyl)cyanoimidodithiocarbonate, for example, was very effective against *Rhizoctonia solani* and *Venturia inaequalis*. This is significant because the organisms represent both soil and foliage disease-causing organisms.

The exemplary procedures which illustrate effectiveness as soap bacteriostats consisted essentially of adding a stated amount of the compound to a soap solution and preparing serial dilutions of this composition in agar. The agar dilutions were then inoculated with different microbes, incubated at a definite temperature for a definite time after which the dilutions were examined to determine inhibition of growth by the test compound.

This experiment demonstrated toxicity against *Staphylococcus aureus*. A 1% stock solution of the test material prepared in a non-toxic solvent was diluted in agar to provide test samples containing various concentrations of the test material. Petri dishes were respectively filled with the test mixture, and the plates thus prepared were then respectively inoculated with said *Staphylococcus aureus* organism and incubated for 48 hours at 37° C. At the end of that time inspection of the plates inoculated with the following test materials showed complete inhibition of growth of the organism at the indicated concentration while identical agar test plates, except that no test material was present, showed normal uninhibited bacterial growth.

TABLE I

| Test material: | Concentration |
|---|---|
| S,S'-bis(3,3-dichloroallyl)cyanoimidodithiocarbonate | [1]1/M |
| S,S'-bis(2,3,3-trichloroallyl)cyanoimidodithiocarbonate | 1/M |
| S,S'-bis(2-chloroallyl)cyanoimidodithiocarbonate | [2]1/100T |
| S,S'-bis(3-chloroallyl)cyanoimidodithiocarbonate | 1/100T |
| S,S'-bis(2-bromoallyl)cyanoimidodithiocarbonate | 1/100T |
| S,S'bis(3-chloro-2-butenyl)cyanoimidodithiocarbonate | 1/100T |
| Cis- and trans-S,S'-bis(2,3-dichloroallyl)cyanoimidodithiocarbonate | 1/10T |
| S,S'-bis(2-methallyl)cyanoimidodithiocarbonate | 1/10T |
| S,S'-bis(2-propynyl)cyanoimidodithiocarbonate | 1/10T |

[1] M=1,000,000
[2] T=1,000

In the following table is shown the toxic effect provided by some of the compounds of this invention against the fungus *Aspergillus niger*. A 1.0% stock solution of the test material in a non-toxic solvent was made up, and this solution was added to sterile, melted dextrose agar in a quantity to give various concentrations of test material. After thorough mixing the agar was poured into Petri dishes and allowed to harden. One drop of a spore suspension of the fungus was applied as inoculum for each plate. The inoculated plates were incubated at a suitable temperature for 5 days. At the end of that time, inspection of the dishes showed complete inhibition of growth of the test fungus at the concentration shown while plates not containing test material but otherwise identical and incubated similarly, showed normal uninhibited growth.

TABLE II

| Test material: | Concentration |
|---|---|
| S,S' - bis(allyl)cyanoimidodithiocarbonate | 1/100T |
| Cis- and trans-S,S'-bis(2,3-dichloroallyl)cyanoimidodithiocarbonate | 1/100T |
| S,S'-bis(3,3-dichloroallyl)cyanoimidodithiocarbonate | 1/100T |
| S,S'-bis(3-chloroallyl)cyanoimidodithiocarbonate | 1/100T |
| S,S'-bis(3-chloro-2-butenyl)cyanoimidodithiocarbonate | 1/100T |

Test material: Concentration

S,S'-bis(2,3,3-trichloroallyl)cyanoimidodithiocarbonate _____ 1/100T
S,S'-bis(2-chloroallyl)cyanoimidodithiocarbonate _____ 1/10T
S,S'-bis(2-bromoallyl)cyanoimidodithiocarbonate _____ 1/10T
S,S'-bis(2-methallyl)cyanoimidodithiocarbonate _____ 1/10T
S,S'-bis(2-propynyl)cyanoimidodithiocarbonate _____ 1/10T Compounds of the present invention protected apple foliage from *Venturia inaequalis*, causative organism of apple scab. A 1.0% stock solution of the test chemical in a non-toxic solvent was made and an aliquot thereof diluted to the desired concentration and applied to the leaves of new growth of apple seedlings. Twenty-four hours later conidia of *Venturia inaequalis* was sprayed on the same foliage. The inoculation was obtained from four isolates of Venturia representing the three races and a wild isolate, all cultured on potato dextrose broth and harvested after four weeks growth. Spores from all cultures were mixed and the spore load adjusted to 10,000 spores per ml. The inoculated plants were then incubated in a greenhouse chamber and disease incidence recorded after 14–20 days incubation. Perfect control was observed with the following test chemicals at the concentration indicated:

TABLE III

Test chemical: Concentration, p.p.m.
S,S'-bis(2-chloroallyl)cyanoimidodithiocarbonate _____ {1, 3}
S,S'-bis(3,3-dichloroallyl)cyanoimidodithiocarbonate _____ 3
S,S'-bis(3-chloroallyl)cyanoimidodithiocarbonate _____ 1
S,S'-bis(2-bromoallyl)cyanoimidodithiocarbonate _____ 1
S,S'-bis(2-methallyl)cyanoimidodithiocarbonate _____ 10
S,S'-bis(2-propynyl)cyanoimidodithiocarbonate _____ 3
S,S'-bis(3-chloro-2-butenyl)cyanoimidodithiocarbonate _____ 10
S,S'-bis(2,3,3-trichloroallyl)cyanoimidodithiocarbonate _____ 3
Cis- and trans-S,S'-bis(2,3-dichloroallyl)cyanoimidothiocarbonate _____ 3

Activity was demonstrated against "damping off" fungi. Those present were principally Pythium, Rhizoctonia, and Fusarium species. A stock solution of the test material was pipetted into a glass jar containing one pound of infested soil. The jar was sealed and the contents thoroughly mixed by vigorous shaking. The treated soil was incubated at room temperature for 24 hours, transferred to clay pots and 15 seeds of each of two crop plants sown in each pot. The crop plants were Dalta Pine No. 15 cotton, and Straight Eight cucumber. The seeded pots were then incubated at 70° F. at 98% humidity to insure activity of the organisms in the soil. Twenty-four hours later, the pots were removed to a greenhouse and disease assessments made within 10–14 days. The percent emergence and disease incidence were recorded. The ratings were based on inoculated, untreated, and uninoculated sterile soil treatments. For convenience in recording the data the following rating scale was used.

Rating: Disease incidence (healthy plants out of 30)
1 _____ 25–30
2 _____ 19–24
3 _____ 13–18
4 _____ 8–12
5 _____ 0–7

TABLE IV

| Toxicant | Conc. p.p.m. | Soil Fungicide Rating |
|---|---|---|
| S,S'-bis(allyl)cyanoimidodithiocarbonate | 10 | 2 |
| S,S'-bis(2-chloroallyl)cyanoimidodithiocarbonate | 10 | 2 |
| S,S'-bis(2-bromoallyl)cyanoimidodithiocarbonate | 3 | 2 |
| S,S'bis-(2-propynyl)cyanoimidodithiocarbonate | 30 | 2 |
| S,S'bis(2,3,3-trichloroallyl)cyanoimidodithiocarbonate | 30 | 2 |
| S,S'bis(3-chloroallyl)cyanoimidodithiocarbonate | 30 | 2 |
| S,S'bis(methallyl)cyanoimidodithiocarbonate | 30 | 2 |
| S,S'-3-chloro-2-butenyl cyanoimidodithiocarbonate | 30 | 2 |

In this experiment the contact activity of S,S'-bis(3,3-dichloroallyl)cyanoimidodithiocarbonate, S,S' - bis - (3-chloroallyl)cyanoimidodithiocarbonate, S,S'-bis(2-bromoallyl)cyanoimidodithiocarbonate, S,S'-bis(2 - methallyl)cyanoimidodithiocarbonate, and S,S'-bis(3-chloro-2-butenyl)cyanoimidodithiocarbonate was evaluated in an aqueous medium against yellow fever mosquito larvae *Aedes aegypti*. Solutions of the test chemicals in acetone were prepared and diluted with distilled water to form various concentrations of the test chemical. Approximately 25 fourth-instar yellow-fever mosquito larvae were placed in each of the test solutions and held at room temperature for a period of 24 hours, after which time mortality observations were taken. At a concentration of 10 p.p.m., 100% mortality was observed for each of the test chemicals. At a concentration of 2.5 p.p.m., a mortality of 100% was observed for S,S'-bis(3-chloro-2-butenyl)cyanoimidodithiocarbonate, and at this same concentration 90% mortality was observed for S,S'-bis(3,3-dichloroallyl)cyanoimidodithiocarbonate, S,S'-bis(3-chloroallyl)cyanoimidodithiocarbonate, and S,S'-bis(2-bromoallyl)cyanoimidodithiocarbonate.

The foregoing experiments demonstrate that the new compounds protect against the destructive effect of microorganisms including both fungi and bacteria. Application of the chemical to the area to be protected, in which the organism may or may not already be present, in a concentration toxic to such microorganisms affords a high degree of protection. As noted, some of the compounds are useful for destroying insects. For achieving these various objects it is often advantageous, where the compounds are applied in aqueous medium, to incorporate into the aqueous medium a surface active agent in small amount sufficient to lower the surface tension of the water. The amount will usually be within the range of 0.01–1.0%. Besides water, organic solvents and admixtures thereof, suitable inert carriers include finely divided solids, as for example clay and silica.

Some of the compounds are contact herbicides in concentrations of 0.2% and above. Utility of cis- and trans - S,S'-bis(2,3-dichloroallyl)cyanoimidodithiocarbonate, S,S' - bis(allyl)cyanoimidodithiocarbonate, S,S'-bis(3 - chloroallyl)cyanoimidodithiocarbonate and S,S'-bis(2 - methallyl)cyanoimidodithiocarbonate was demonstrated by applying the compounds as aqueous sprays to 2-week old plants. The following observations were made: All of the brome grass, sugar beet, foxtail, crab grass, and pigweed plants sprayed with a 0.5% solution of cis- and trans-S,S'-bis(2,3-dichloroallyl)cyanoimidodithiocarbonate were killed whereas there was moderate injury to grass, radish, wild buckwheat, and sorghum plants. Grass and bean plants sprayed with a 0.5% solution of S,S'-bis(allyl)cyanoimidodithiocarbonate were killed and there was severe injury to broadleaf plants in general. At a concentration of 0.2% there was severe injury to broadleaf plants in general. At a concentration of 0.2% there was severe injury to crab grass, moderate injury to bean, rye grass, and wild oat plants, and only slight injury to broadleaf plants. Sugar beet, pigweed, wild buckwheat, and tomato plants sprayed with a 0.5% solution of S,S' - bis(3-chloroallyl)cyanoimidodithiocarbonate were killed and there was severe injury to morning glory, radish, foxtail, and soybean plants. Moderate injury to brome grass, rye grass, and crab grass plants was also observed. Sugarbeet, wild buckwheat and tomato plants sprayed with a 0.5% solution of S,S'-bis(2-methallyl)cyanoimidodithiocarbonate were killed and there was severe injury to broadleaf plants, pigweed, and soybean plants.

It is intended to cover all changes and modifications of the examples of the invention herein chosen for purposes of disclosure which do not constitute departures from the spirit and scope of the invention.

What is claimed is:
1. A compound of the formula

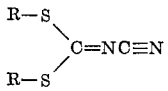

where R is selected from the group consisting of lower alkenyl, halogen substituted lower alkenyl, and lower alkynyl.

2. S,S'-bis(allyl)cyanoimidodithiocarbonate.
3. S,S'-bis(2-chloroallyl)cyanoimidodithiocarbonate.
4. S,S'-bis(2-bromoallyl)cyanoimidodithiocarbonate.
5. Cis- and trans-S,S'-bis(2,3-dichloroallyl)cyanoimidodithiocarbonate.
6. S,S'-bis(2-propynyl)cyanoimidodithiocarbonate.

References Cited by the Examiner
UNITED STATES PATENTS

| | | | |
|---|---|---|---|
| 2,310,799 | 2/1943 | Fontz | 167—22 |
| 2,686,203 | 8/1954 | Hechenbleikner | 260—551 |
| 2,697,727 | 12/1954 | Kaiser et al. | 260—551 |
| 3,145,138 | 8/1964 | Baker | 167—22 |

References Cited by the Applicant
UNITED STATES PATENTS

| | | |
|---|---|---|
| 2,430,332 | 11/1947 | Guy et al. |
| 2,881,070 | 4/1959 | Pera. |
| 2,882,071 | 4/1959 | Buckman et al. |

WALTER A. MODANCE, *Primary Examiner.*

H. I. MOATZ, *Assistant Examiner.*